United States Patent [19]

Gardner et al.

[11] Patent Number: 5,144,217
[45] Date of Patent: Sep. 1, 1992

[54] CORDLESS TOOL BATTERY HOUSING AND CHARGING SYSTEM

[75] Inventors: Billy J. Gardner, Rocky Mount Tarboro, N.C.; Ralph A. Secoura, Timonium, Md.

[73] Assignee: Black & Decker Inc., Newark, Del.

[21] Appl. No.: 415,456

[22] Filed: Sep. 29, 1989

Related U.S. Application Data

[63] Continuation of Ser. No. 167,063, Mar. 3, 1989.

[51] Int. Cl.$^5$ .................. H01M 10/46; H02J 7/00
[52] U.S. Cl. ........................... 320/2; 320/15; 320/35
[58] Field of Search ........................ 320/2-6, 320/35, 36, 54, 15

[56] References Cited

U.S. PATENT DOCUMENTS

| | | | |
|---|---|---|---|
| 2,451,726 | 10/1948 | Fry | 320/4 |
| 2,579,538 | 12/1951 | Bierce | 174/67 X |
| 2,979,650 | 4/1961 | Godshalk et al. | 320/35 |
| 3,421,142 | 1/1969 | Kircher | 320/54 X |
| 3,614,584 | 10/1971 | Burkett et al. | 320/35 |
| 3,644,873 | 2/1972 | Dalton et al. | 320/2 X |
| 3,665,285 | 5/1972 | Mullersman et al. | 320/2 |
| 3,710,224 | 1/1973 | Daniels | 320/2 |
| 3,736,547 | 5/1973 | Koenig | 439/137 X |
| 4,091,318 | 5/1978 | Eichler et al. | 320/2 |
| 4,173,733 | 11/1979 | Sugalski et al. | 320/2 X |
| 4,214,197 | 7/1980 | Mann et al. | 320/2 |
| 4,354,092 | 10/1982 | Manabe et al. | 320/2 X |
| 4,403,182 | 9/1983 | Yeh | 320/2 |
| 4,493,517 | 1/1985 | Hillary | 439/140 |
| 4,588,938 | 5/1986 | Liautaud et al. | 320/2 |
| 4,616,171 | 10/1986 | Hernandez et al. | 320/30 |
| 4,873,479 | 10/1989 | Iimura et al. | 320/2 |

FOREIGN PATENT DOCUMENTS

| | | |
|---|---|---|
| 2702129 | 7/1978 | Fed. Rep. of Germany .......... 320/2 |
| 3144858 | 7/1982 | Fed. Rep. of Germany . |
| 3104778 | 9/1982 | Fed. Rep. of Germany . |
| 8619967 | 8/1987 | Fed. Rep. of Germany . |

OTHER PUBLICATIONS

Bosch Power Tool Catalog Nov./1987 pp. 44-47.
Bosch Power Tool Brochure (German) Feb., 1989.

*Primary Examiner*—Robert Hickey
*Attorney, Agent, or Firm*—Dennis A. Dearing; John D. Del Ponti; Charles E. Yocum

[57] ABSTRACT

In a battery housing and charging system for a range of cordless tools, a universal charger accepts battery packs of several configurations and size (number of cells). The common feature of the battery packs is (at least) one cell housed on end and substantially coaxial with a specific terminal block assembly. Terminal pins are shielded from external contact and engage the charger terminals in a recessed well in the floor of the charger receptacle. Charger terminals are at one end of the receptacle which is elongated so that it can accommodate a battery pack "nose" portion with either one or two cells housed on end and side-by-side. Upright side walls of the receptacle provide stabilizing support for the battery pack. In the battery pack portion outside the receptacle, cells may be arranged in any configuration to suit tool or other requirements. Charger output terminals are normally biased away from their respective terminal apertures to minimize risk of accidental contact with live terminals. Charging control circuitry, including means for sensing battery temperature, is all contained in the charger assembly, with a visible indication of charging condition registered by a light emitting diode and transmitted externally through an optic light pole. In assembly of the charger, accurate register of charger output terminal carried on a printed circuit board, with corresponding terminal apertures in the floor of the charger receptacle is achieved through the mutual engagement of a tapered dowel and mating hole in these parts.

49 Claims, 4 Drawing Sheets

CORDLESS TOOL BATTERY HOUSING AND CHARGING SYSTEM

This application is a continuation, of application Ser. No. 7/167,063, filed Mar. 3, 1989 now abandoned.

BACKGROUND OF THE INVENTION

The invention concerns the housing and recharging of batteries for battery powered devices such as portable power tools and certain kitchen and domestic appliances, and more particularly a system in which a contained group of power cells, commonly known as a battery pack, may be inserted into a device as a power source, and removed from the device and inserted into a charger assembly for recharging.

The several advantages of cordless power for tools and appliances have led to the development of a wide range of sizes of power- or battery-pack. Low powered units of two or three cells have long been known. Much larger sizes are becoming more common and there is already a potential demand for units up to say twenty cells. Preferably one charger should handle all sizes of battery pack.

It has been conventional to use chargers based on a step down transformer. The inherent isolation of charger output terminals and of batteries under charge from high charger input voltages is an advantage. But transformer chargers are essentially voltage sources and transformer size must be closely related to the number of cells to be charged. With some electronic circuitry the range of a given transformer charger can be extended somewhat, but this is not generally cost effective and a "universal" transformer charger, for covering a wide range of battery pack sizes, is not feasible.

The capacitive charger, essentially a current source, is not "cell dependent" in the way that a transformer charger is. Hence it has been a potential alternative or replacement for the transformer charger, but high capacitor cost has hindered its introduction. However, recent developments in capacitor design, notably the introduction of the metalized film capacitor, makes its use in charger design cost effective. But to realize the potential contribution of the capacitor to the design of a more truly universal charger, charger receptacle and terminal assembly design must preferably be made compatible with battery packs not only varying in power size but also in physical size and configuration. At the same time it must be recognized that the capacitor charger is inherently non-isolated so that the charger and battery pack terminals, and the cell terminals when under charge, are at high voltage.

Hence, it has continued to be common practice to provide a specific charger for each tool resulting in wasteful duplication. In U.S. Pat. No. 4,173,733, Sugalski suggests a combination in which one charger design accepts at least two configurations of holder, holding cells for charging. But Sugalski does not deal with battery packs per se and in his design, integrity or stability of the connection between the cell holder and charger depend entirely on the button and socket-type terminals connecting them, and at least before connection, the terminals on both cell holder and charger are exposed.

To adapt his charger to different battery packs, Busch, in German Patent DE 2702129, accepts the inconvenience of additional parts, providing a specific adapter for fitting each of two styles of battery pack to the charger receptacle. The charger terminals remain exposed at the bottom of the charger receptacle.

Figures 1, 2, 3, 5, 6:
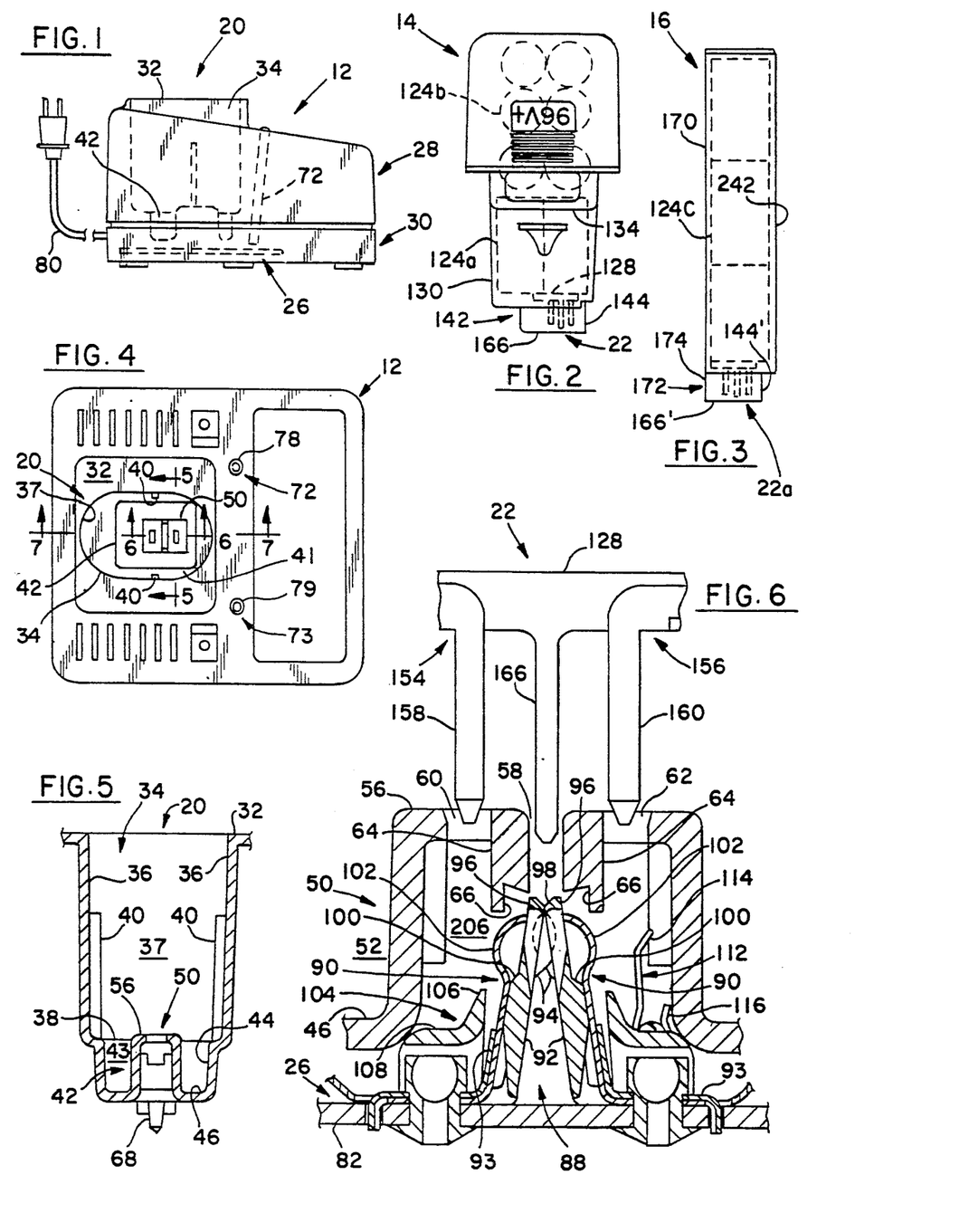
FIG. 1 is a side view of a battery charger embodying part of the invention.
FIGS. 2 and 3 are respectively side views of first and second embodiments of battery packs rechargeable by the charger of FIG. 1.
FIG. 5 is an enlarged cross section taken approximately on line 5—5 of FIG. 4 showing details of the battery pack receiving receptacle of the charger.
FIG. 6 is a much enlarged partial cross section of the charger taken approximately on line 6—6 of FIG. 4, showing details of the charger terminal assembly and also a portion of the terminal block of a battery pack in position for connection with the charger.

Important elements in the control of a charging process are, typically a device for sensing battery temperature (often a thermistor is used), and an associated charging indicator light. Normally the temperature sensor is closely associated with one or more of the cells of the battery pack and the entire charger/tool system is burdened with the cost of providing a temperature sensor and possibility indicator light for each battery pack, as in Sugalski. In another example, Hashimoto, in German Patent DE 3144858 (FIG. 2), discloses a thermistor within the battery pack. His configuration requires an additional terminal on the battery pack and on the charger to electrically connect the thermistor with the charging circuit. Hernandez in U.S. Pat. No. 4,616,171 discloses a thermistor (FIG. 4a) projecting through an opening 120 in charger casing 121. Thermal contact with batteries 206 of the battery pack 200 is made through opening 212 (FIG. 6). This arrangement avoids the duplication of control elements in the battery packs but has the disadvantage of requiring potentially troublesome openings in the charger and battery pack housings.

It is well known to provide the openings of electrical power outlets with shutters or shields which impede accidental contact with their live terminals. See for example U.S. Pat. Nos. 2,579,538 Bierce and 4,493,517 Hillary, both of which disclose safety shutter arrangements in an outlet, normally responsive only to the insertion of a conventional mating plug. But similar provisions in charger/battery pack combinations are not known.

SUMMARY OF THE INVENTION

Accordingly it is a general object of the invention to provide a battery pack and charger system for a line of power tools and appliances which, compared with existing systems, is simpler, safer and more convenient to operate and potentially lower in manufacturing cost.

Another object of the invention is to provide a system of cooperating charger receptacle and battery pack configurations commensurate with the capacity of a single charge to service battery packs of a wide range of power size.

A further object is to provide battery and charger terminals which permit easy engagement, one with another, but which are designed to minimize risks of inadvertent shorting of either set of terminals, and of shock hazard to personnel.

Another object is to improve system cost and convenience by accommodating all charging control circuitry and control elements in the charger assembly so as to avoid duplication of such parts in the battery packs.

Another object of the invention is to provide a charger design which includes a low cost, simple and efficient assembly feature for maintaining alignment or registration between related portions of the terminal assembly of the charger.

These objects may be achieved in a preferred embodiment in which a single charger assembly may accommodate either of at least two different configurations of battery pack, and a range of power capacity or number of cells in each configuration. To assist in meeting the objects of the invention, the charger may be of a non-isolated type such as capacitive.

The charger assembly may have a two level receptacle for receiving a battery pack. A larger, primary chamber guides the connecting "nose" of the battery pack to a second smaller chamber in its floor. A pedestal may extend upwardly from the floor of the second chamber and a pair of output terminals of the charger be recessed in the pedestal with their contacts normally biased away from apertures in the upper portion of the pedestal. Risk of dangerous contact through inadvertent insertion of an object through the apertures is thus minimized.

All battery packs may have identical or, as far as the charger assembly is concerned, interchangeable terminal blocks at the base of their nose portions for engagement with the charger terminals. Each terminal block includes a pair of terminals spaced apart and separated by an insulating member somewhat longer than the terminals, virtually isolating the terminals one from the other. A shrouding wall surrounds the terminals and divider wall so that chances of accidental short circuiting contact across the terminals is much reduced.

Risk of accidental damaging contact with terminals is also minimized when connecting the battery pack to the charger. The walls of the charger receptacle guide the nose of the battery pack so that its terminal block registers with the charger terminal assembly. In the act of connecting, the insulating wall of the battery pack terminal block actuates the terminals of the charger assembly to bring them into receiving and electrically conducting position relative to the battery pack terminals. The depth of the primary chamber of the charger assembly receptacle is such that before any electrical contact is made between charger and battery pack both terminal assemblies are made remote from external access by the presence of the nose of the battery pack in the receptacle. After connection, the shrouding wall of the battery pack terminal block surrounds the charger terminal assembly pedestal in the lower chamber of the receptacle, and the walls of the primary chamber provide support to maintain the battery pack erect.

It is a feature of the invention that all battery packs have a nose portion shape which mates with at least a portion of the main chamber of the charger assembly receptacle in such a way as to guide its terminal block into unique registration, and also to accept support from the walls of the receptacle for maintaining the battery pack erect and ensuring the integrity of the connection between battery pack and charger.

It is also a feature of the battery packs that in their nose or base portions all battery cells are oriented axially with respect to the receptacle. The nose portion may comprise a single cell so that the nose portion occupies only one side of the charger receptacle. An asymmetrical charger terminal disposition facilitates this. Or, the nose portion of the battery pack may comprise two or more side-by-side cells, occupying more of or completely occupying the receptacle. In either case, the battery pack terminal block may abut a cell end, greatly facilitating the assembly operation of making electrical connection between cell and battery pack terminal.

Battery cells in portions of the battery pack outside the receptacle may be oriented to suit such requirements as compatibility of the battery pack configuration with tool shape or with a compactness requirement. For low powered tools, placing two, three or four cells end-to-end in an elongated generally cylindrical housing (a "stick pack") may be convenient. For bigger tools and packs, holding say up to 20 cells, the cells beyond those in the receptacle may be disposed transversely of the nose cells and stacked for a compact configuration—one which facilitates manufacturing, particularly with respect to electrical connection between the various cells. Preferably the battery pack housing is of rigid plastic with a specific housing for each power size conforming quite closely to its particular cell subassembly configuration. Structural integrity of the cell subassembly before insertion in its housing and insulation of the cell subassembly within the housing may be enhanced by encasing the cell subassembly in a tight fitting boot of a flexible material.

In another aspect of the preferred embodiment a battery temperature sensor forming part of the charging control circuit, is housed in the charger assembly in a location apparently remote from the batteries. But the sensor is carried by an electrically insulated metallic portion of the charger terminal assembly and is in reliable thermal contact with the batteries in the battery pack, principally through the thermal conductivity of the respective charger and battery pack terminal members. A visual charging indicator associated with the charging control circuit may also be housed in the charger assembly so that costly duplication of charger control elements in the battery packs is avoided.

In keeping with the invention, a desirable precision in registration between terminal apertures (in an upper portion of the charger housing) and the charger terminal assembly (carried by a printed circuit board floatingly supported by a lower portion of the charger housing) is achieved. As the housing portions are brought together, the locating or positioning effect of a tapered pin in one of the related elements, engaging a hole in the other brings the printed circuit board and hence the terminal assembly into precise alignment with the terminal apertures in the upper portion of the housing.

BRIEF DESCRIPTION OF THE DRAWINGS

FIG. 4 is a somewhat enlarged overhead view of the charger of FIG. 1.

FIGS. 10 and 11 are bottom views showing the terminal block arrangement of the battery packs of FIGS. 2 and 3 respectively. In FIG. 11 the relative position of the charger receptacle walls is shown in phantom outline.

DESCRIPTION OF THE PREFERRED EMBODIMENT

Figures 7, 15:
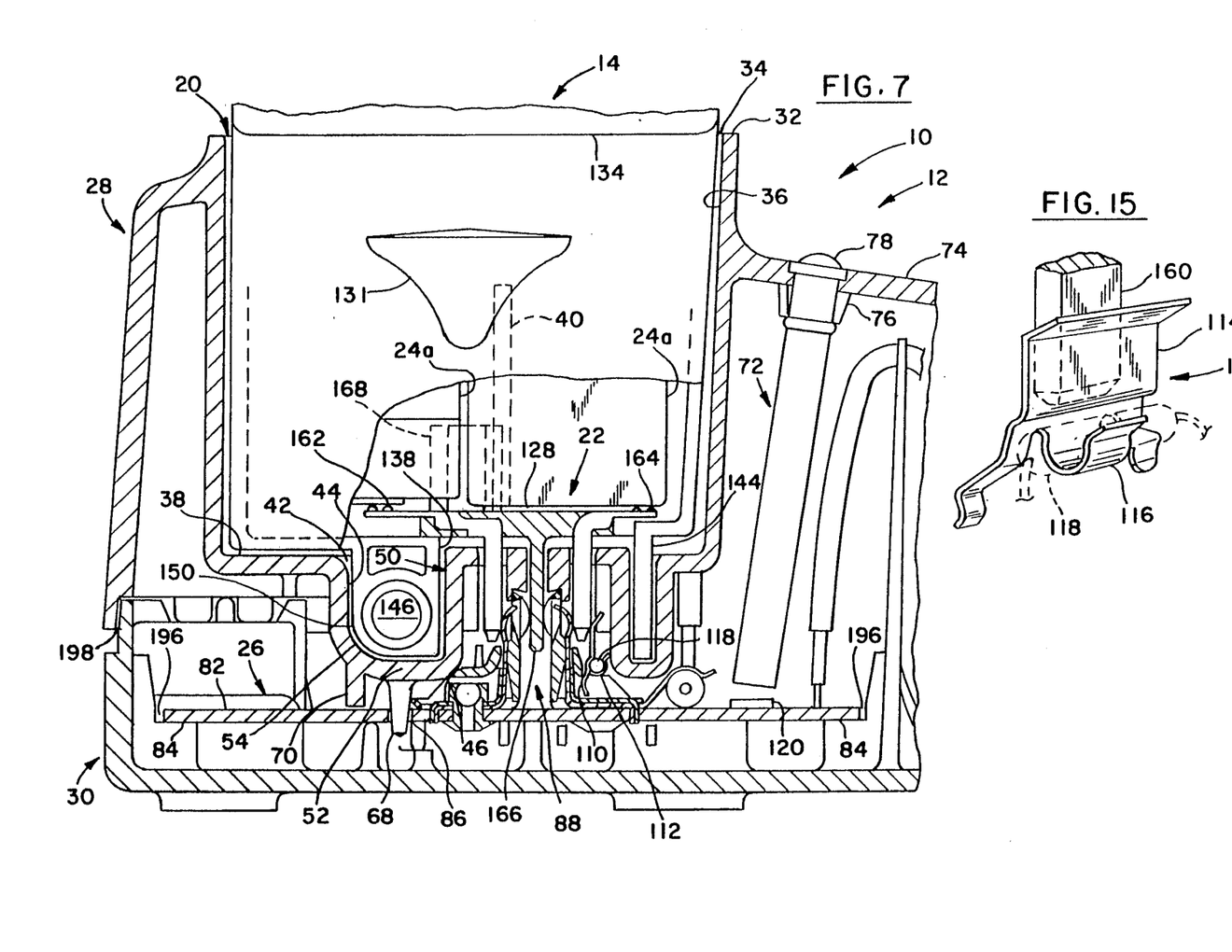
FIG. 7 is an enlarged cross section of the charger taken approximately on line 7—7 of FIG. 4 with a battery pack connected and in a charging relationship.
FIG. 15 is an enlarged pictorial view of the thermistor mounting clip of the charger assembly in contact with a terminal pin of a battery pack.
Figure 8:
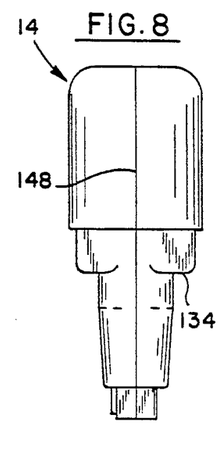
FIG. 8 is an end view of the battery pack of FIG. 2.
Figure 9:
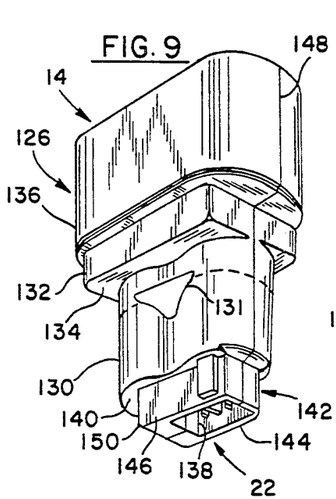
FIG. 9 is a perspective view of the battery pack of FIG. 2 as viewed from below.
Figure 10:
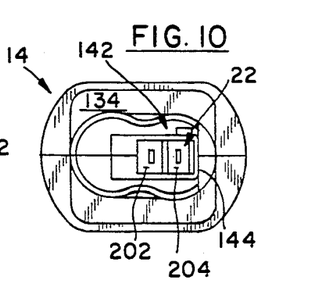
Figure 13:
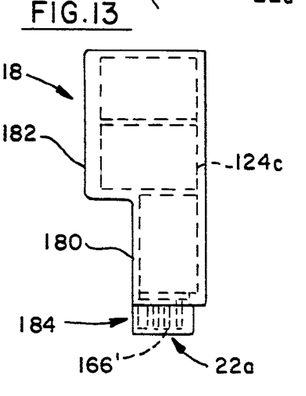
FIG. 13 is a side view similar to FIG. 3 of a third embodiment of battery pack.
Figure 14:
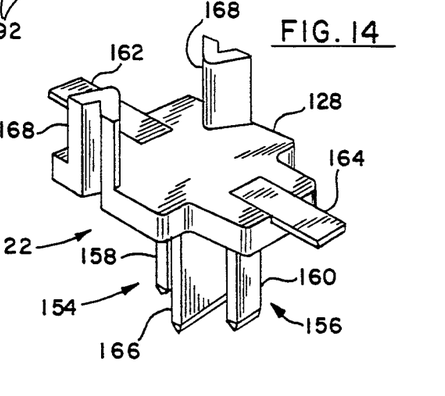
FIG. 14 is an enlarged pictorial view of the terminal block of the battery pack of FIG. 2.

The invention is embodied in the battery pack and charger combination 10 shown partially in FIG. 7 which includes the charger and battery pack assemblies 12 and 14 shown in FIGS. 1 and 2 respectively. Second and third embodiments (16, 18) of battery pack are shown in FIGS. 3 and 13 respectively. The receptacle 20 of charger assembly 12 is designed to receive several different configurations of battery pack, including a range of power sizes in each of those configurations. The terminal block 22 shown in FIG. 14 may be used, with minor internal variations, in all battery packs.

The charger assembly 12 is of a non-isolated type, preferably capacitive. Its principal components include a printed circuit board 26, enclosed in a housing split at approximately the level of the printed circuit board into upper and lower housing portions 28 and 30 respectively. The charger assembly 12 may be used in a horizontal position as shown in the drawings or in a variety of other positions, including for example mounted with the base or lower housing 30 against a vertical surface. For convenience, however, in discussion it will be assumed that the charger is on a horizontal surface as shown so that terms such as upper and lower, top and bottom, may be understandably applied. Similar terms will be used for the battery pack assemblies, as if they were in position for charging, received into the receptacle 20 of the charger assembly 12.

Looking now at the charger assembly 12 in some detail and referring to FIGS. 1 and 4 through 7—a principal feature of the upper housing portion 28 is the battery pack receiving receptacle 20, which extends deeply into the charger assembly from a battery pack supporting platform 32 which substantially surrounds it. The upper and primary chamber 34 of the receptacle is of generally oval cross-section (as seen best in FIG. 4). Its upright side walls 36 terminate in a generally horizontal floor 38. A pair of vertically extending battery pack locating ribs 40 extend from the floor to about two thirds the height of the side walls 36 and help to define a terminal end portion 41 of the receptacle 20. The floor 38 opens downwards into a secondary chamber 42, the generally rectangular form of which is seen best in FIG. 4. Its generally upright side walls 44 descend to a generally horizontal floor 46.

A terminal assembly pedestal 50 dominates the secondary chamber 42 and extends upwards from the floor 46 somewhat into the primary chamber 34. Its generally rectangular shape in plan and its asymmetrical disposition in the lower chamber 42 are also best seen in FIG. 4. The space of the lower chamber 42 remaining between the pedestal 50 and the side walls 44 of the chamber is moat-like in form and at its widest point 52 the floor 46 meets the side wall 44 at a generously radiused corner 54 (FIG. 7). The top wall 56 of the pedestal is penetrated by three apertures, symmetritrically placed, and including a longer, central, insulator aperture 58, flanked by terminal apertures 60 and 62 (see FIG. 6). Descending partway within the pedestal 50 from its top wall 56 are a pair of shielding walls 64, which also define the lateral sides of the insulator aperture 58. At its lower end, each wall 64 is recessed or rebated outwards to define a pair of shield extending lips 66.

Internal features of the housing upper portion 28, best seen in FIG. 7, include a vertically descending, generally conical, tapered pin 68 extending downwards from the secondary chamber floor 46 below the moat space 52. A retaining or stop leg 70 alongside the pin 68 descends only about half the length of the pin.

A pair of optic light poles or lenses 72, 73 extend downwards alongside the receptacle 20 and each is suspended from sloping wall portion 74 of the upper housing 28 by a "snap-latch" retaining arrangement 76. Their lens like ends 78, 79 are approximately flush with the surface of the sloping wall 74. (FIGS. 4 and 7)

The printed circuit board 26 carries much of the electrical circuitry of the charger system and external power is brought to it through the power cord 80. However, only components concerned with the present invention will be discussed. The board itself 82 is supported in the housing lower portion 30 by support surfaces such as ledges or seats 84 shown in FIG. 7. On initial assembly into the housing lower portion, the board is free to float or be adjusted in a horizontal plane relative to the housing. In assembly, a locating hole 86 in the board 82 registers with and is penetrated by the tapered pin 68 of the housing upper portion 28. This feature of the assembly will be discussed in more detail below.

A charger terminal assembly 88 carried by the board 82 extends upwards into the center of the terminal pedestal 50. (See FIG. 6). It includes a pair of leaf-like terminal blades 90 each associated with a spring terminal support 92 and both cantilevered from the board 82 and biased toward each other into the center disconnected position shown in FIG. 6. Bias is augmented by "helper" leaf springs 93. Towards their upper or outer ends the spring terminal supports 92 bear a series of cam lobes 94 spaced so that when the supports 92 meet the cam lobes 94 interleave on the common center line of terminal block 22 (especially insulating member 166) and charger terminal assembly 88, as shown in FIG. 6. The upper ends 96 of the supports 92 are shaped so as to define an upwardly opening curved V or cam entry 98. Operative contact between the leaf-like terminals 90 and their supports 92 is only at a fulcrum 100 raised on the face of the support 92. The supports 92 are recessed above this point to provide clearance for the somewhat hook-like upper ends 102 of the terminals 90. Symmetrically straddling the terminal assembly 88 is a pair of deflector ramps 104, each having an upper tip 106 adjacent and somewhat below the upper ends 102 of the terminals 90 and a lower portion 108, extending outwards in assembly, close to the level of the floor 46 of the secondary chamber 42 of the receptacle.

Adjacent one of the terminals 90, an upright recess 110 in the terminal assembly 88 supports a thermistor clip 112, so that it stands erect approximately parallel to the terminal 90, as seen best in FIGS. 7 and 15. An upper contact portion 114 of the thermistor clip 112 is approximately horizontally opposite the upper hook-like contact portion 102 of the terminal. Closely below the contact portion 114 of the thermistor clip, a resilient cradle 116 supports a thermistor 118. The board 82 also carries a pair of light emitting diodes 120, 121 (121 not shown) disposed on the upper side of the board so that in assembly they register with the lower ends of the optic posts 72, 73. Diode 120 is green, 121 is red.

Turning now to exemplary battery packs for use with the charger assembly 12 just described—clearly they must be compatible both structurally and electrically with the charger assembly 12, but details of the electrical circuitry of the packs and the electrical characteristics of the battery cells need not be discussed in any detail here. In the battery pack embodiments disclosed, all battery cells are cylindrical in form and may be, for example, nickel cadmium cells of the sub C or 4/5ths sub C size.

The three embodiments disclosed (FIGS. 2, 3 and 13) represent two basic configurations of battery pack—the so-called "standard" and "stick" packs.

In the "standard" battery pack 14 of FIGS. 2 and also 8, 9, 10 and 16-18, the cells 124 are contained in a relatively thin walled housing 126, preferably of a suitable substantially rigid plastic material. The shape of the housing is determined primarily by the arrange-ment of the cells, but other functions such as support of the pack in the charger assembly 12 and providing stability and support for the cells inside the housing as well as asthetics may influence the shape. The cell arrangement in the standard pack is characterized in having a pair of upright side-by-side cells 124a in the lower or nose portion of the pack, with the base 128 of terminal block 22 below them, and additional cells 124b stacked transversely in pairs above them. Only the eight cell size of standard pack is shown here. Advantages of this cell arrangement configuration are compactness and its suitability for a range of battery pack sizes, (say from four cells to 20 cells) and facilitating the manufacture of an electrically connected sub assembly of cells in preparation for its insertion into the pack housing 126. (This cell subassembly is discussed in more detail below). A particular form of the "standard" pack (not shown in the drawings) may include only the two lower upright cells 124a.

In the typical "standard" battery pack, such as the eight cell size shown here, the housing 126 has three main sections. The lower or nose portion 130 is of connected double cylindrical form in cross section (see FIGS. 9 and 10), conforming quite closely to the "envelope" of the two lower cells 124a. This portion may carry a raised external latch or pawl 131 for retaining the pack in the receptacle of a power tool or appliance. A middle portion 132 of the housing 126 is somewhat wider, in part to begin the accommodation of the transverse cells 124b and also to provide a horizontal ledge 134, which contributes to the support of the pack in the charger assembly. A further enlarged upper portion 136 of the housing accommodates the bulk of the transverse cells 124b. An offcenter opening 138 in the housing base 140 is protected by a downwardly extending shroud 142 consisting of a straight wall 144 on three of its sides and a thickened lobe 146 on the fourth. The presence of this lobe 146 reinforces the housing at this potentially vulnerable point; may accommodate a fastener for "locking" the housing if it is made in two halves, split on a vertical plane (such as that indicated at 148 in FIGS. 8 and 9); and its radiused corner 150 may assist in guiding the battery pack into final seating in the receptacle 20 of the charger assembly 12.

The terminal block assembly 22 consists of a plastic base or frame 128, into which are molded (best seen in FIGS. 6, 7 and 14) metal terminals 154, 156, the terminal pins of which 158, 160 extend downwards but remain within the shroud 142. Each terminal 154, 156 includes a connecting tab 162, 164 respectively, for making the electrical connection with the respective lower cells 124a. The terminal block assembly 22 and the cells 124 of the pack thus form a subassembly (to be described in more detail below) when electrically connected for insertion as a unit into the housing 126 of the standard battery pack 14. Integral with the terminal block base or frame 128 is an insulating wall 166, extending downwards and centrally placed between the terminal pins 158, 160. The height of this wall 166 exceeds the length of the terminal pins. Its width substantially fills the transverse width of the shrouded terminal block opening 138, so that the terminal pins 158, 160 are effectively screened, one from the other. Extending upwards from the terminal block base 128 are a pair of V-guides 168 which help to locate the lower cells 124a relative to the terminal block 22. The offset location of the terminal block 22 results in the guides 168 being almost in line with the terminal pin 158.

The "stick pack" configuration of battery pack (FIGS. 3, 11 and 13) is advantageous for packs of a smaller total number of cells and for tool environments, for example, where the simple elongated cylindrical form of FIG. 3 is desirable; or where the more compact but essentially flat form of FIG. 13 is appropriate. Pack size of two to four cells is the most useful range for the stick pack.

Figure 11:
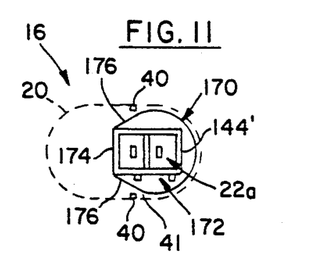

In the "stick" battery pack 16 of FIG. 3 the housing 170 is of modified circular cross section as best seen in FIG. 11, and accommodates three cells, 124c arranged end to end. This pack preferably uses a terminal block assembly 22a outwardly the same as the standard pack terminal assembly, and shielded in a similar way with a shroud 172. This is identical with the shroud 142 of the standard pack except that the thickened lobe portion 146 is absent, so that a wall 144' of uniform thickness extends on all four sides. As seen best in FIG. 11 the modification of the cylindrical form of the housing 170 consists of extending it to coincide with the outer face 174, of the shroud 172 and completing the form with tangential surfaces 176.

In the L-shaped stick pack 18 of FIG. 13, the three cells 124c lie with their longitudinal axes in a common plane. The lower portion 180 of the housing 182 is identical with that of the straight stick pack of FIG. 3, including the disposition of the terminal block assembly 22a, with respect to the immediately adjacent lower of the cells 124c, and the shroud 184.

Figure 12:
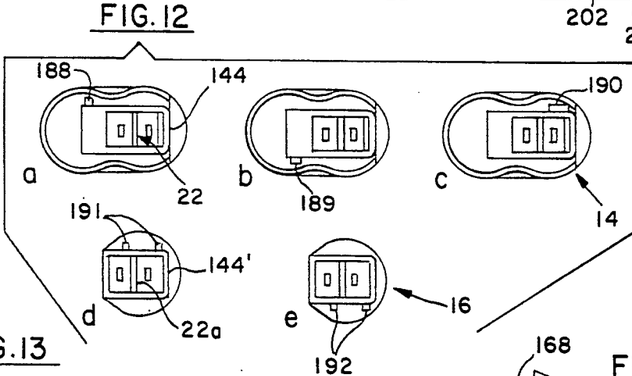
FIG. 12 includes bottom views of the terminal block assemblies of battery packs of the first embodiment in two, three and eight cell sizes (12a through c respectively) and of the second embodiment in two and three cell sizes (12d, 12e) to show a sample of the key lockout pattern used to limit the battery packs to connection only with compatible tools.

FIGS. 12a through 12e show a sampling of the "key lockout" system used to standardize the shrouded terminal arrangement of the battery packs according to number of cells, whether in standard or stick pack configuration—so as to avoid mismatch between battery pack and tool. The determining feature is a ridge or land 188, 189, 190, 191, 192 extending vertically in a predetermined location on the outside of the shroud walls 144, 144'. FIGS. 12a–c show, respectively, the disposition of lands 188, 189 190 for standard packs of two, three and eight cell sizes. FIGS. 12d and e show respectively the disposition of lands 191 and 192 for the two and three cell stick pack.

Figure 16:
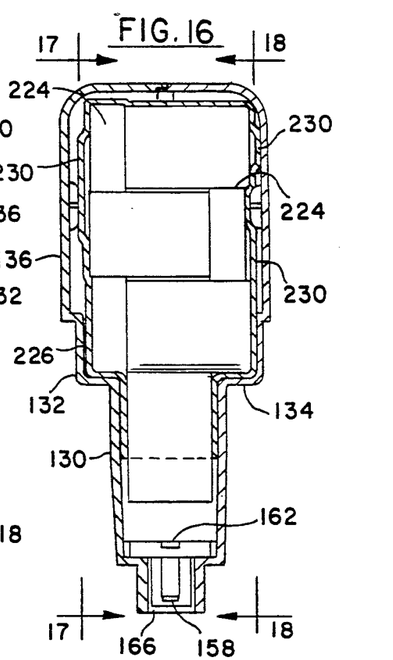
FIG. 16 is an enlarged end view similar to FIG. 8 of the battery pack of FIG. 2, but cut away to show details of the battery cell subassembly.
Figure 17:
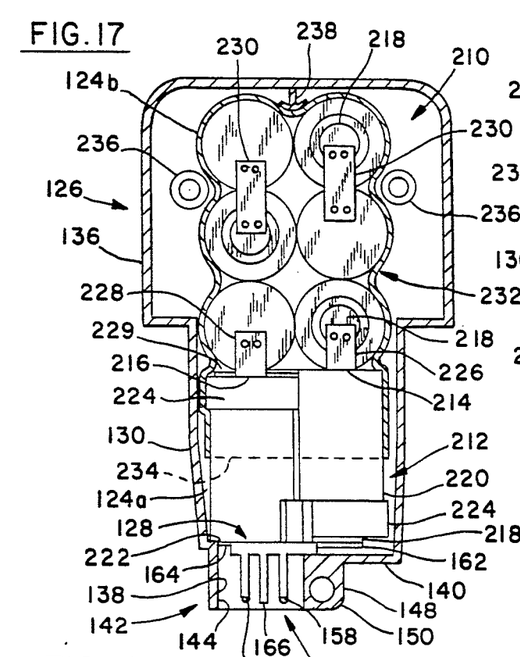
FIG. 17 is an enlarged view taken approximately on line 17—17 of FIG. 16 showing further details of the battery cell subassembly.
Figure 18:
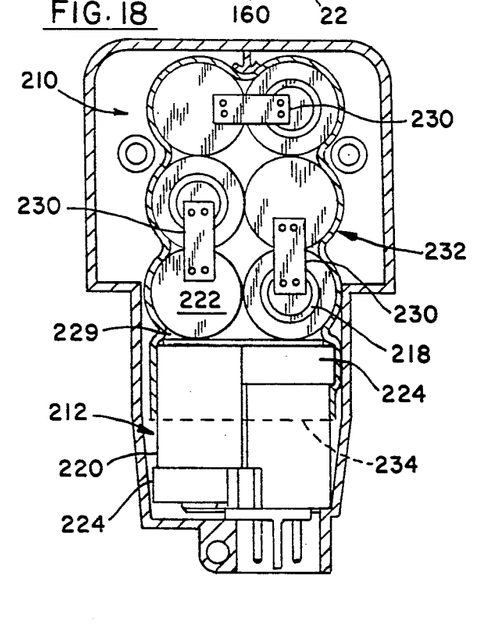
FIG. 18 is a view similar to FIG. 17 but taken from the opposite side of the battery pack, approximately on line 18—18 of FIG. 16.

Details of a standard pack battery cell subassembly 210, for an eight cell pack of cells 124 are seen best in FIGS. 16–18. This assembly begins with a preliminary subassembly 212 consisting of the two battery pack nose portion cells 124a, the terminal block 22 and connecting straps 214, 216. The cells 124 (124a, 124b) are preferably nickel-cadmium cells of conventional construction having a central positive electrode 218, a cylindrical casing 220 and a negative electrode 222 at the opposite end. Each cell 124 in the subassembly 210 is fitted with an insulating cap 224, as protection from inadvertent short circuiting between the positive electrode 218 and an edge of the casing 220. The caps 224 of neighboring cells also act as insulating spacers to keep cells parallel and maintain separation between cell casings 220 as may be seen in FIGS. 16–18.

In the subassembly 212 of the nose cells 124a, the terminal block base member 128 abuts the ends of the cells (see FIG. 17 for example) and the terminal tabs 162, 164 are connected directly to the cell electrodes 218, 222 by a suitable method such as electrical resistance welding. This virtual integration of the terminal block 22 with the cell subassembly has structural advantages and eliminates the need for wiring and simplifies assembly. The stick pack configuration of battery pack (FIGS. 3 and 13) benefits from a similar close juxtaposition of terminal block (22a) and cell end. Preparatory to making up the complete subassembly 210 the ends of connecting straps 214, 216 are bent up at right angles to form connecting tabs 226, 228 for connecting with the two lower cells 124a. The remaining four upper cells 124b are "stacked" above these so that the juxtaposed cell ends of opposite polarity are coplanar, as seen best in FIG. 16. An insulating board 229 separates the casings 220 of the upper cells 124b from the ends of the lower cells 124a. Series connection of the cells is made by connecting straps 230, seen best in FIGS. 17 and 18. Permanent connection of connecting straps 230 and tabs 226, 228 to the cell electrodes is made by some suitable process such as electric resistance welding. As seen in the figures, all electrical connections of upper cells 124b of the standard pack configuration are made in a pair of spaced apart parallel planes. Such "uniformity" simplifies such operations as setting the connecting straps 230 in position and connecting them (as by resistance welding), and facilitates automation of the assembly of cell subassembly 210.

Before being encased in the battery pack housing 126, the cell subassembly 210 is enshrouded in a tight fitting "boot" 232. Preferably the boot 232 is of natural rubber, or as an alternative, a flexible plastic applied by a heat-shrink process may be used. In both cases the boot must be tight enough and tough enough to assist materially in maintaining the structural integrity of the cell subassembly 210, and in supplementing the insulation of the cells afforded by the housing 126. With the boot 232 in place, inadvertent puncturing or rupturing of the housing 126 would not expose "live" portions of the cell subassembly to outside contact. As indicated in FIGS. 16 to 18, the mouth 234 of boot 232 should reach preferably at least halfway down the lower cells 124a. The cells of the battery pack are at high voltage only when the battery pack is inserted in the charger and charging and in that condition substantially the entire nose portion 130 of the battery pack housing 126 is shielded by the walls of the charger receptacle 20.

The cell subassembly 210 is stabilized within the battery pack housing 126 by its relatively snug fit in the nose portion 130 and, in the upper housing portion 136, by its engagement with bosses 236 and spacer element 238, integral with the housing portion 136.

An eight cell battery pack has been used as an example of the "standard pack" configuration but the design is suitable for a wide range of sizes, twenty cells being an example of a larger size. In this, the "upper" portion would include 18 cells 124b. The range of sizes may also include an odd number of cells such as eleven. In the odd sizes, a centrally placed single cell occupies the uppermost layer of the stack of cells 124b (not shown in the drawings).

Figure 19:
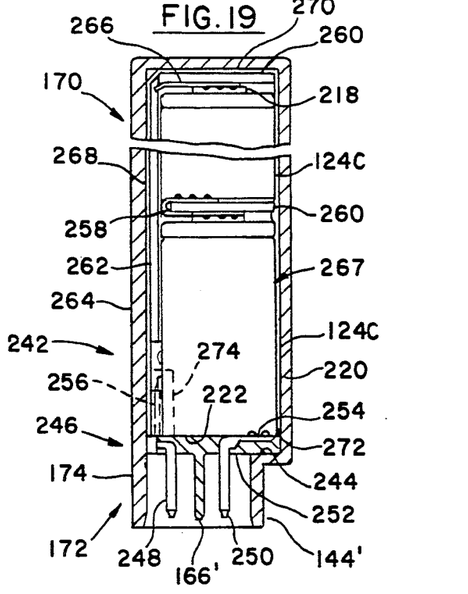
FIG. 19 is a cut away view similar to FIG. 18 of the stick pack battery pack of FIG. 3. It indicates the cell connection arrangement for a pack of two or more cells.

A stick pack battery pack 16 is shown in more detail in FIG. 19. The drawing shows the arrangement for a pack of two or more cells. The lower or nose portion 242 of the housing 170, including the terminal shroud 172, includes an internal shoulder 244 for positioning and retaining the terminal block assembly 22a in the housing. This portion of the housing, including the shroud 172 and shoulder 244, may be referred to generally as the terminal end 246 of the housing.

The structure of the terminal block assembly 22a is very similar to that of the standard pack assembly (22) described above. Positive and negative terminals 248, 250 respectively, are molded into an insulator block or support member 252. Negative terminal connecting tab 254 connects directly (for example by electrical resistance welding) with the negative end 222 of the first cell 124c. Positive terminal connecting tab 256, perpendicular to the support member 252, extends up alongside the cell casing 220. The insulator wall 166' separating the terminals 248, 250 is integral with the terminal block base 252.

Intermediate series connection of the cells 124c is made by a folded connector strap 258 rigidly connected to the cell ends (for example as by resistance welding) with an insulator pad 260 ensuring a desired separation between the ends of neighboring cell casings. Electrical series connection of the cells is completed by a wire lead assembly 262 connected by a slide-on connector 264 at positive terminal tab 256 and a permanently wired connection 266 at the positive electrode 218 of the top end cell of the pack. This connection is also protected by an insulator pad 260 and the complete subassembly 267 of connected cells with terminal block assembly 22a is enshrouded in a boot 268 extending from its closed end 270 at the top of the pack to an open mouth 272 encircling the bottom cell 124c, close to its end 222. As seen in FIG. 11 the cross section of housing 170 is not completely round. This departure from a purely cylindrical form in part provides space for a pair of upright spaced apart guide members 274 which help to determine and maintain the rotational position of the cell and terminal block subassembly 267 within the housing 170.

Comparison of FIGS. 7 or 18 and 19 shows the essential similarity between battery packs of the standard and stick type with regard to the juxtaposition of terminal block assemblies and a first cell of the battery pack, and also of the direct connection of the negative terminal—a compact and efficient design with the potential for savings in manufacturing cost and good reliability in service.

In the assembly of the charger 12, precise alignment or register between the terminal apertures 60, 62 and the insulator wall aperture 58 of the pedestal 50 with terminal assembly 88 is obtained through the interaction of the tapered pin 68 of the housing upper portion 28 and the dowel or locating hole 86 in the printed circuit board 82. As can be seen in FIG. 7, space 196 is provided at the supports or seats 84 of the printed circuit board base 82, so that as the assembly of the two halves 28, 30 of the charger housing is made, the housing halves fit snugly at joint 198 and the final position of the printed circuit board base 82 is determined by the progressively limiting entry of the pin 68 into the hole 86. In the manufacture of the housing upper portion 28 the horizontal disposition of the apertures 58, 60, 62 is gauged entirely with reference to the locating pin 68. In the sub assembly of the printed circuit board 26, disposition of the charger terminal assembly 88 is made entirely with reference to the gauge or locating hole 86, thus ensuring the desired precision of register or alignment of aperture with terminal.

A battery pack and charger assembly system according to the invention is particularly useful when the charger is of a non-isolated type such as capacitive. In such a system the cells and the battery and charger terminals are at a high voltage during charging so that in operating the system there is the potential for electric shock, as well as shorting of the terminals of either battery pack or charger assembly when they are potentially exposed before or after connection and charging.

The combination of the battery pack terminal block assembly (22, 22a) and the shroud (142, 172, 184) with its walls (144, 144') cooperating with the transverse terminal block insulating wall (166, 160'), so isolates and shields the respective battery terminal pins (158, 160) in their respective "cells" (202, 204, seen best in FIG. 10), that the possibility of inadvertent short circuiting contact between them is almost eliminated. And, as indicated above, the walls of the battery pack housing 126 and the boot 232 give the internal cell subassembly 210 two layers of protection.

Inadvertent contact with the charger assembly terminals 90 is also very well guarded against. First of all, the charger terminal assembly 88 is protected by being at the bottom of the relatively deep receptacle 20. There, in the secondary chamber 42 of the receptacle, the terminal assembly 88 is recessed within its protective housing pedestal 50. To enhance this protection, the apertures 58, 60, 62 in the pedestal top 56 are kept small. Hence the importance of the precise alignment between these apertures and the terminal assembly 88 referred to above.

In the "open" condition of the charger and particularly the charger terminal assembly 88 as shown in FIG. 6, the terminals 90 are retracted away from the vertical line of the terminal apertures 60, 62 under the resilient action of the terminals 90 (helped by leaf springs 93) and their supports 92. The combination of this retracted position of the terminal 90 and the limited access provided by the small apertures 60, 62 severely limits the possibility of contact with a terminal 90, in case of inadvertent entry of a metallic object or probe through one of the apertures. In case of entry of a metallic "probe" of sufficient length and small cross section through one of the apertures 60, 62, the shielding walls 64 would initially divert the probe from the terminals 90 and on further entry the probe would encounter one of the ramps 104 and tend to be diverted away from the terminal 90. Only a small window 206 is left between the lips 66 of wall 64 and the tip 106 of the ramp 104, and terminal contact portion 102 is well shielded within.

In preparation for charging operation the terminals 90 must be erected into the near vertical operating position shown in FIG. 7. This is accomplished by the advance entry of the insulating wall 166 in its second role as a terminal assembly actuator through the aperture 58, to encounter the cam entry 98, and progressively separate the cantilevered spring terminal supports 92 in a circumferential direction, so that the terminals 90 are moved into operating position, in readiness for electrical contact with the battery pack terminal pins 158, 160. The contact pressure of each contact portion 102 is augmented by the "leverage" of its fulcrum 100.

Operation of the battery charging circuit in charger 12 is controlled in part by the thermistor 118. The control variable is battery temperature. Mounted on its clip 112, the thermistor 118 is in a good thermally conductive relationship with the battery cells 124 of the battery pack. The chain of this conductivity is from the thermistor through its clip 112, and particularly the contact or terminal portion 114 of the clip, to the battery pack terminal 160 and through to the battery cells 124 of the battery pack. The thermistor clip 112 is held in its retaining recess 110, in such a way that it is biased for good contact against the pin 160. (See FIGS. 7 and 15.) The heat insulating effect of the deep receptacle 20 helps in heat transfer from battery to thermistor. Advantages of this simple low cost thermistor mounting include ease of assembly and isolation of the thermistor from the charger terminals when no battery pack is present.

The use and function of thermistors in battery charger circuits is well known although, conventionally, the thermistor is mounted in the battery pack in close association with one or more of the battery cells. Although in an unconventional location the thermistor here functions in a similar way. Electrical resistance of the thermistor varies with its temperature. The system is designed so that when, for example, the thermistor senses a temperature corresponding to a fully charged condition of the batteries, it signals a control circuit to interrupt charging. In the present invention, the condition of the charging system is visually indicated through the medium of the light emitting diodes (LED) 120, 121 (121 not shown) carried by the printed circuit board base 82. Emission of red light (LED 121, not shown) indicates that the system is charging and light from the LED is transmitted by the optic light pole 73 for an external visual indication at lens 79. Similarly, a green light, at lens 78, from LED 120, indicates that charging is complete. (See FIGS. 4 and 7)

As has already been indicated, the system of the present invention comprises a common charger assembly 12, which will accept a variety of battery pack configurations and of sizes or powers within those configurations. Within the context of a potentially extensive line of portable power tools or devices, the charger assembly becomes universal. A basis of this universality is the innovative design of the receptacle 20. It is based on a unit of two battery cells erect and side by side. The asymmetrical disposition of the terminal assembly towards one end of the receptacle floor defines one end of the receptacle as the terminal end (41) and hence, in the battery pack a corresponding terminal-adjacent cell.

This relationship is maintained in all battery pack configurations and sizes acceptable to the charger.

The contribution of the depth of the receptable 20 to electrical safety has been referred to above. The depth and shape of the receptacle also keeps each battery pack securely erect when installed in the charger assembly. This stability is enhanced by the engagement of the ledge 134 in the housing 126 of the standard pack configuration of battery packs with the charger housing platform 32 surrounding the top of the receptacle 20. Dimensions are such that this engagement limits the entry of the battery pack into the receptacle so that it does not bottom out and so that its weight is supported by the substantial platform 32 and the ledge 134 rather than elements at the bottom of the receptacle.

The stick pack configurations of FIGS. 3 and 13 are limited in size as described above and hence are lighter and no special provision is made for vertical supportof their weight. However, they are guided into and held erect in the charger receptacle terminal end 41 by the internal vertical ribs 40 of the receptacle. (Juxtaposition shown in phantom outline in FIG. 11).

In this disclosure of the invention only one charger embodiment and a limited number of battery pack embodiments have been included, but clearly the invention has wider application, both in terms of variations within the spirit of the invention and also in terms of the large number of tools and other devices represented in the field of the invention. These tools may include for example, electric drills, screwdrivers, circular saws, jigsaws, flashlights, string trimmers and many others from the general power tool as well as the lawn and garden tool fields and the field of small domestic appliances.

An important aspect of the invention, the cost effective and convenient universality of the charger assembly, derives in part from "keying" the connection of the charger and battery pack to the unit of a single cylindrical cell, on end in the charger receptacle and with a terminal block substantially coaxial with the cell. The charger receptacle is elongated to accommodate at least one more cell alongside the first, and is made deep enough to provide at least auxiliary support for the portion of the battery pack housing contained in the receptacle. In the charger assembly disclosed, the receptacle will accommodate battery packs with a maximum of two side-by-side cells in the charger engaging "nose" of the pack. Clearly, in keeping with the invention, a receptacle may be extended to accept a battery pack housing three or more side-by-side cells in its nose. In such an extended version, the "prime" cell associated with the terminal block of the battery pack could still be at one end, or alternatively, the terminal block could be associated with one of the intermediate cells. In the latter case upright ribs on the receptacle walls similar to ribs 40 in FIGS. 5 and 11 could be provided to offer auxiliary support for the battery packs needing it, such as the stick pack type having only one upright cell in the receptacle area. In all cases, the present charger/battery pack system concept combines providing substantial support for the battery pack in the charger (by virtue of the potential engagement of a portion of the battery pack housing with the walls of the receptacle and upper support platform, when applicable) with a minimum limitation on the configuration of the battery pack outside the receptacle. It will be realized that the concept of charger receptacle configuration must be compatible with tool receptacles also, and that it is in association with the tool that freedom in battery pack configuration design is especially valuable.

All of these possible embodiments of interfacing between charger and battery pack according to the invention, would enjoy the related advantages of convenience economy and safety. Confined to the charger assembly, the charging control circuitry is potentially more reliable and the cost of duplicating it (especially the means for sensing battery temperature changes) in every battery pack is avoided. The particular shielding given the terminals of the charger assembly and the terminals and cells of the battery pack inherently reduces the risk of electric shock or inadvertent short circuiting and is effective when charger and battery pack are connected for charging as well as when they are separated. The reliability of these safety features is enhanced by the means provided to achieve accurate register in assembly between the charger terminals and their access apertures.

We claim:

1. A battery pack and charger assembly in combination comprising:

a battery pack having a terminal block including an insulator carrying a pair of spaced apart terminal pins, the insulator including an elongated insulating member extending between the pins, the insulating member and the terminal pins being generally parallel and extending in a first direction when the battery pack is inserted in the charger assembly;

a charger assembly including (1) a receptacle for accepting the insertion of the battery pack, (2) a terminal assembly for engagement by the terminal block of the battery pack, the terminal assembly including a pair of normally retracted terminal blades, and (3) a housing for substantially enclosing the terminal assembly, said housing including a receptacle with a sunken floor and substantially upright walls, the floor including apertures registering with the terminal assembly; and terminal blade control means included in the terminal assembly of the charger assembly, responsive to engagement by the insulating member of the battery pack terminal block, for erecting the terminal blades into an operating position so that when the battery pack is inserted into the charger assembly each terminal pin makes electrical contact with one of the terminal blades.

2. The combination of claim 1 and including a charging control arrangement having a means for sensing changes in battery temperature, said sensing means being carried by the charger assembly.

3. The combination of claim 2 wherein the means for sensing changes in battery temperature is included in the charger terminal assembly, so that when the battery pack is inserted in the charger assembly the sensing means is in a close heat-conducting relationship with one of the terminals of the battery pack terminal block, and thus in a heat receiving relationship with the at least one cell of the battery pack.

4. The combination of claim 3 wherein the charger terminal assembly includes a metallic element in direct contact with said one of the battery pack terminal pins and the means for sensing is carried by that element.

5. The combination of claim 1 wherein the insulating member extends beyond the pins in the first direction.

6. The combination of claim 5 wherein the terminal pins and the insulating member of the battery pack terminal block are surrounded by a shroud-like generally upright wall, said wall extending beyond the terminal pins in the first direction, and the insulating member substantially spanning the shroud-like wall between the terminal pins so that each pin is substantially shielded from inadvertent external or short circuiting contact.

7. The combination of claim 1 wherein the receptacle floor includes a raised pedestal spaced from the walls of the receptacle so that a moat-like space surrounds the pedestal, the pedestal having a substantially planar top and said top including said apertures.

8. The combination of claim 7 wherein the battery pack includes a shroud-like wall surrounding the pins of the terminal block so that when the battery pack is inserted in the receptacle of the charger assembly, said wall enters the moat-like space of the receptacle and axially overlaps the pedestal.

9. The combination of claim 1 wherein the receptacle floor is elongated so that it may be bisected into a first end and a second end, and wherein the apertures are disposed within the first end of said floor.

10. The combination of claim 1 wherein the terminal blades are resiliently biased one towards the other and each is biased away from its operating position.

11. The combination of claim 1 wherein the terminal blade control means includes a closely spaced opposing pair of cam members, each cam member supporting a terminal blade, the cam members and terminal blades being disposed so that upon inserting engagement of the insulating member with the cam members, the cam members are forced apart in a circumferential direction and the terminal blades are erected into the operating position.

12. The combination of claim 11 wherein the insulating member comprises a wall bisecting the space between the battery pack terminal pins, and wherein when the battery pack is inserted in the charger assembly, the charger terminal assembly and the battery pack terminal block share a common center line defined by said wall.

13. The combination of claim 12 wherein the respective cam members each include an arm cantilevered within the charger terminal assembly and each having a free end and a cam disposed adjacent said end, said cams facing each other and overlapping in the circumferential direction at the common center line.

14. A battery pack and charger assembly in combination comprising:
 a battery pack having a terminal block including an insulator carrying a pair of spaced apart terminal pins, the insulator including an elongated insulating member extending between the pins, the insulating member and the terminal pins being generally parallel and extending in a first direction when the battery pack is inserted in the charger assembly;
 a charger assembly having a receptacle for accepting the insertion of the battery pack and including a terminal assembly for engagement by the terminal block of the battery pack, the terminal assembly including a pair of normally retracted terminal blades;
 terminal blade control means included in the terminal assembly of the charger assembly and comprising closely spaced opposing pair of cam members, each cam member supporting one of said terminal blades;
 the cam members and terminal blades being disposed so that upon inserting engagement of the insulating member with the cam members, the cam members are forced apart in a circumferential direction and the terminal blades are erected into the operating position;
 the terminal blades and the cam members independently cantilevered within the charger terminal assembly; and
 each terminal blade having a free end contoured so that when the battery pack is inserted in the charger assembly the terminal pins engage the contoured portions of the terminal blades and tend to deflect the terminal blades towards the common center line establishing a contract pressure between the terminal pins and blades.

15. The combination of claim 14 wherein the inserting engagement of the terminal pins with the terminal blades deflects said blades towards the common center line and further including a fulcrum effective between the respective cam arms and terminal blades, each fulcrum resisting the deflection of its respective terminal blade so that said contact pressure is intensified.

16. A battery pack and charger assembly in combination comprising:
 a battery pack having a terminal block including an insulator carrying a pair of spaced apart terminal pins, the insulator including an elongated insulating member extending between the pins, the insulating member and the terminal pins being generally parallel and extending in a first direction when the battery pack is inserted in the charger assembly;
 a charger assembly having a receptacle for accepting the insertion of the battery pack and including a terminal assembly for engagement by the terminal block of the battery pack, the terminal assembly including a pair of normally retracted terminal blades;
 terminal blade control means included in the terminal assembly of the charger assembly and comprising closely spaced opposing, independently cantilevered, pair of cam members, each cam member supporting one of the terminal blades;
 the cam members and terminal blades being disposed so that upon inserting engagement of the insulating member with the cam members, the cam members are forced apart in a circumferential direction and the terminal blades are erected into the operating position; and
 said terminal assembly including a pair of stop surfaces engageable by the respective cam members for limiting circumferential movement of the cam members in the direction of erecting the terminal blades.

17. The combination of claim 1 wherein when the battery pack is inserted in the charger assembly and the terminal pins are in engagement with the terminal blades, said terminal pins and terminal blades all extend substantially in the first direction.

18. The combination of claim 17 wherein the charger terminal assembly includes for each terminal blade a deflector wall extending from the floor in the first direction towards the terminal blade, and includes alongside each terminal blade a deflecting member, said deflecting wall and deflector member defining a contact window, but otherwise substantially shielding the terminal blade when said terminal blade is in its retracted position.

19. A terminal block for use in a battery pack which is insertable in a charger assembly so that the terminal block engages a terminal assembly of the charger, the battery pack having a housing for holding at least one elongated cell, the cell having a longitudinal axis and an end, the block comprising:
- a generally planar base member for disposition adjacent the end of the cell and generally perpendicular to the longitudinal axis of the at least one cell when in use in the battery pack;
- a pair of spaced apart terminal pins carried by the base member and extending perpendicular to the base;
- an insulating member extending between and generally parallel to the terminal pins to shield the terminal pins one from the other; and
- a pair of upright spaced guide members carried by the base, extending oppositely to the terminals pins and, when in use, into the housing of the battery pack for engaging and at least partially determining the position of the at least one cell.

20. The terminal block of claim 19 wherein the insulating member extends further from the base member than the terminal pins.

21. The terminal block of claim 19 wherein the guide members and one of the terminal pins lie in adjacent parallel planes.

22. The block of claim 19 further comprising a first terminal tab extending parallel to the plane of the base for connection to one terminal of the at least one cell.

23. The block of claim 22 further comprising a second terminal tab extending from the base plane in a generally opposite direction to the first terminal tab for connection to the opposite terminal of the pack.

24. A charging system comprising:
- a first battery pack for insertion into a first tool as a power source and having a first nose housing only a single cylindrical cell;
- a second battery pack for insertion into a second tool as a power source and having a second nose housing at least two side by side cylindrical cells, the circumference of the second nose being larger than the circumference of the first nose;
- the first and second noses including a first and second battery terminal assembly respectively;
- a charger comprising:
- a housing;
- a receptacle in the housing for selectively receiving, engaging and stably supporting for charging any one of the first and second packs, the receptacle including (1) an elongated primary chamber having a pair of opposite side walls and a pair of opposite first and second end walls and a floor, the spacing between the end walls defining receptacle length and (2) a secondary chamber opening into the floor of the primary chamber and having opposite sidewalls and opposite first and second end walls and a floor;
- the primary chamber shaped to supportively accommodate (1) the second nose of the second battery pack with the at least two cylindrical cells on end side by side and upright relative to the floor of the primary chamber when the second battery pack is inserted in the charger and (2) the first nose of the first battery pack with the single cell on end and upright relative to the floor of the primary chamber; and
- a shielded charger terminal assembly contained with the housing for selectively engaging one of the first and second pack terminal assemblies when a selected one of the first and second packs is inserted into the receptacle, said shield charger terminal assembly extending from the floor of the secondary chamber towards the primary chamber.

25. The system of claim 24 wherein the secondary chamber is closer to the first end wall than to the second end wall of the primary chamber.

26. The system of claim 25 wherein the first end wall of the secondary chamber is adjacent the first end wall of the primary chamber, and the shielded charger terminal assembly is adjacent said first end walls.

27. The system of claim 25 and including a pair of opposite ribs, one in each side wall of the primary chamber, and extending parallel to the end walls of said chamber, and defining unequal subdivisions of said primary chamber for providing support to any one of the first and second battery pack when inserted into the receptacle.

28. The system of claim 24 wherein the shielded charger terminal assembly includes, for shielding the terminal assembly, a raised pedestal extending from the floor of the secondary chamber and having a top wall and terminal apertures included in said top wall, said apertures communicating with the terminal charger assembly.

29. The system of claim 28 wherein the pedestal is disposed closer to the first end wall of the secondary chamber than to the second end wall of said secondary chamber.

30. The system of claim 27 and including a battery pack auxiliary support platform spaced from the floor of the primary chamber so as to establish chamber depth, and wherein the walls of the primary chamber terminate at said platform.

31. The system of claim 30 wherein the depth of the primary chamber is greater than approximately half the length of said chamber.

32. A charger assembly for receiving and charging a battery pack comprising:
- a first housing portion including a receptacle chamber having a floor and a pair of terminal apertures in the floor, and a first circuit board terminal alignment element;
- a second housing portion for registering with and engaging in assembly in a fixed relationship with the first housing portion so as to define a substantially closed housing with the receptacle chamber opening outwards, and including a support for a printed circuit board establishing, in assembly, a printed circuit board support plane below the receptacle floor; and
- a printed circuit board supportable in the support plane of the second housing portion for at least limited floating movement in the support plane, and carrying a pair of charger output terminals and a second alignment element;
- the first and second alignment elements disposed and sized for mutual engagement as the housing portions are brought together in assembly to fix the position of the printed circuit board in the support plane as engagement of the housing portions is completed and to fix the relative positions of the terminal apertures and the charger output terminals in predetermined register.

33. The charger assembly of claim 32 wherein one of the first and second alignment elements is a tapered pin and the other is an aperture.

34. The charger assembly of claim 33 wherein the tapered pin is carried by and extends inwardly of the first housing half and the aperture is included in the printed circuit board.

35. A charging system comprising:
a first battery pack having a first nose housing a single cylindrical cell;
a second battery pack having a nose portion housing at least two side by side cylindrical cells having parallel longitundial axes, the circumference of the second nose being larger than the circumference of the first nose;
a first pack terminal assembly comprising a base member disposed adjacent the end of the single cell, a positive pin and a negative pin, each pin extending generally parallel to the longitudinal axis of the single cell;
a second pack terminal assembly comprising a second base member disposed adjacent to the ends of the at least two cells, a positive pin and a negative pin, each pin extending generally parallei to the longitudinal axes of the at least two cells; a charger comprising:
a housing;
a receptacle in the housing for selectively receiving, engaging and stably supporting for charging any one of the first and second packs;
the receptacle including an elongated primary chamber having a pair of opposite sidewalls and a pair of opposite first and second end walls and a floor, the spacing between the end walls defining the receptacle length;
the primary chamber (1) shaped to supportively accommodate the second nose of the second battery pack with the at least two cylindrical cells on end side by side and upright relative to the floor of the primary chamber when the second battery pack is inserted in the charger and (2) shaped to supportively accommodate the first nose of the first battery pack with the single cylindrical cell on end and upright relative to the floor of the primary chamber when the first battery pack is inserted in the charger; and
a charger terminal assembly in the floor of the primary chamber, said charger terminal assembly having a negative blade and a positive blade engaging, respectively, the negative and the positive pin of the first battery pack when the first battery pack is inserted in the primary chamber and engaging, respectively, the negative and positive pins of the second pack when the second pack is inserted into the primary chamber.

36. The system of claim 35 wherein:
the receptacle comprises a secondary chamber opening into the floor of the primary chamber and having opposite sidewalls and opposite first and second end walls and a floor; and
the charger terminal assembly extends from the floor of the secondary chamber into the floor of the primary chamber.

37. The system of claim 36 wherein the charger terminal assembly includes a raised pedestal extending from the floor of the secondary chamber and having a top wall and terminal apertures in the top wall, said apertures communicating with the positive and negative terminal blades.

38. The system of claim 37 wherein:
the receptacle includes a battery pack auxiliary support platform spaced from the floor of the primary chamber to establish the chamber depth; and
the walls of the primary chamber terminating at the platform.

39. The system of claim 35 wherein:
the charger includes a displacable means for shielding the charger terminal when no battery pack is inserted in the charger; and
the battery pack includes an actuator for displacing the shielding means for engaging the charger terminals with the battery pack terminals upon insertion of the selected battery pack in the receptacle.

40. The system of claim 39 wherein the displacable means includes cam means engageable by the battery pack actuator, and responsive to such engagement to engage the charger terminals and the battery pack terminals.

41. The system of claim 39 wherein the battery pack actuator is included in the battery pack terminal assembly.

42. The system of claim 35 wherein:
the primary chamber floor has a positive terminal aperture for exposing the positive charger blade and has a negative terminal aperture for exposing the negative charger blade; and
the positive and negative pins of the first battery pack extend through the positive and negative apertures, respectively, when the first battery pack is in the receptacle; and
the positive and negative pins of the second battery pack extend through the positive and negative apertures, respectively, when the second battery pack is in the receptacle.

43. The system of claim 35 wherein the first pack terminal assembly and the second pack terminal assembly are in the same location relative to the charger terminal assembly when the first battery pack and the second battery pack are located in the charger for charging.

44. The system of claims 24 or 35 wherein:
one endwall of the primary chamber and a portion of each sidewall of the primary chamber generally conform to the circumferential shape of the first pack; and
the sidewalls and endwalls of the primary chamber generally conform to the circumferential shape of the second battery pack.

45. A battery pack and charger assembly in combination comprising:
a charger assembly having a housing and a receptacle in the housing, the receptacle comprising an elongated chamber having a pair of opposite side walls, opposite first and second end walls, the spacing between the end walls defining the receptacle length, a floor, terminal apertures in the floor and disposed towards the first end wall, and a charger terminal assembly beneath the floor disposed in a receiving relationship with the terminal apertures; and
a battery pack including a nose portion for housing at least one elongated cell, the cell having a longitudinal axis and opposite ends, and the nose portion including a battery pack terminal assembly with terminal members extending generally parallel to the longitudinal axis of the at least one cell and at least a portion of the terminal assembly overlaying an end of said cell, the nose portion of the battery pack being insertable in the receptacle so that the battery pack terminal assembly penetrates the apertures in the floor of the receptacle and engages the charger terminal assembly and the at least one cell is disposed adjacent the first end wall.

46. The combination of claim 45 wherein the length of the receptacle is sufficient to accommodate a battery pack containing at least two cells side-by-side in the nose portion of said pack.

47. The combination of claim 45 wherein the side walls of the receptacle are engageable with the nose portion of each battery pack, and said side walls are of sufficient height to offer significant support to the battery pack in maintaining it erect with respect to the floor of the receptacle.

48. The combination of claim 45 and including specific means for giving auxiliary support to a battery pack having only a single cell in the nose portion of said pack.

49. The combination of claim 48 wherein the specific means includes means carried by at least one side wall of the receptacle for engaging the nose portion of said battery pack.

* * * * *